United States Patent [19]

Marogil

[11] Patent Number: 4,548,193

[45] Date of Patent: Oct. 22, 1985

[54] MULTI-PURPOSE PORTABLE OUTDOOR COOKING STAND

[76] Inventor: Emmanuel Marogil, 1293 N. La Fox, South Elgin, Ill. 60177

[21] Appl. No.: 648,524

[22] Filed: Sep. 10, 1984

[51] Int. Cl.⁴ .............................................. F24B 3/00
[52] U.S. Cl. .................................... 126/30; 126/9 R; 126/25 A
[58] Field of Search ................... 126/25 R, 25 A, 30, 126/9 R

[56] References Cited

U.S. PATENT DOCUMENTS

| | | | |
|---|---|---|---|
| 2,477,529 | 7/1949 | Sprinkle et al. | 126/9 |
| 2,604,884 | 7/1952 | Walker | 126/30 |
| 3,976,046 | 8/1976 | Morton et al. | 126/25 A |
| 4,117,825 | 10/1978 | Robertson | 126/29 |
| 4,433,671 | 2/1984 | De Amicis | 126/25 A |
| 4,453,530 | 6/1984 | Schlosser | 126/25 R |

Primary Examiner—Carroll B. Dority, Jr.

[57] ABSTRACT

A portable compactly stored outdoor cooking stand can be used either with a self-contained charcoal compartment or over an open campfire, and can cook in many cooking modes including, open flame grilling, frying, steaming, boiling, baking, etc. Thus, a stand for straddling a campfire site vertically arranges one or more of three encompassed cooking utensils, namely a grill cooking surface, a pan for holding food or charcoal, and a vented cover for release of smoke, fumes, or steam. The pan and cover mate to form a portable suitcase-like carrying case with a handle that contains all the other elements for transport and compact storage when not in use.

5 Claims, 4 Drawing Figures

MULTI-PURPOSE PORTABLE OUTDOOR COOKING STAND

TECHNICAL FIELD

This invention relates to outdoor cooking grill stands and more particularly it relates to portable barbecue stands that can be compactly stored for carrying to and from a cooking site such as a picnic or camp ground.

BACKGROUND ART

Outdoor covered grills such as shown in U.S. Pat. No. 4,453,530-E. J. Schlosser, June 12, 1984 are well known in the art. These are for exclusive use with charcoal briquettes as a fuel, and are difficult to transport and store because of their large kettle volume and awkward supporting bracket structure. Furthermore, these devices cannot be used over an open campfire when wood is available as a fuel.

Portable grills are available for exclusive use over open campfires such as those in U.S. Pat. Nos. 2,604,884-B. Walker, July 29, 1952 and 4,117,825-T. A. Robertson, Oct. 3, 1978. These grills have some desirable features such as the ability to mount the cooking surface at various levels to adapt to campfire conditions, the portability features of being foldable and easily assemblable so that they can be compactly stored when not in use, and structure for straddling a campfire. However, these grills have disadvantageous features including that they cannot be used with charcoal fuel briquettes, are not able to cook food within a closed or partly closed compartment, and that after use, the stands cannot be stored or carried in an automobile, for example, without soiling adjacent surfaces with residue, grease and soot.

None of the prior art provides an outdoor portable cooking stand that can be used for various food cooking conditions including grilling, baking, frying, steaming, boiling and simmering.

Accordingly, it is an advantage of this invention to improve the state of the art by resolving the foregoing deficiencies and providing a multi-purpose portable outdoor cooking stand having advantageous features and operable over a wide range of cooking requirements for different foods and fuels.

Disclosure of the Invention

This invention provides a multiple purpose outdoor barbecue stand useful with various fuels including a wood campfire and charcoal briquettes and for various food cooking conditions such as open mesh grilling over flame or charcoal, baking in a covered oven-like structure, frying, steaming, boiling, simmering in water or sauces, etc. Furthermore, the stand is portable with its own self-contained cooking elements serving as a carrying case.

Thus, two carrying case halves serve not only to contain all parts for transport, but also as active cooker elements which can fit in place at various vertical stand locations along with or in place of a grill cooking surface member. Thus, one-half can be a charcoal pan for use under the open grill cooking surface in a conventional manner when a campfire is not available. The other half can be a cover member and is preferably vented with a vent size control for appropriate release of smoke, gases or steam. The one case half may also be used over an open campfire as a frying pan, boiling or simmering vessel, with or without the cover half of the case.

The respective parts are mountable on a stand for straddling a campfire to remain stably in place there, of generally L shaped side profile, and preferably having two spaced vertical posts with means for rack positioning at various vertical levels, which can simply be notches for receiving grill rods, etc.

The carrying case halves mate together like a suitcase and have a hinge, a carrying handle and latch. The handle, latch and hinge preferably is in the form of a detachable spring wire array externally removably disposable about one of the case halves by spring friction fit.

BRIEF DESCRIPTION OF THE DRAWINGS

In the respective views of the drawing showing a preferred embodiment of the invention, like reference characters are used for similar features throughout, to facilitate comparison.

THE PREFERRED EMBODIMENT

Figure 3:
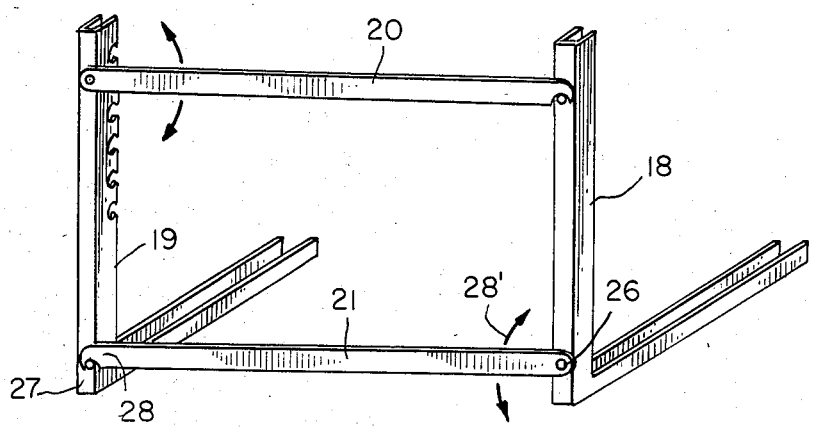
FIG. 3 is a perspective sketch of the cooking stand framework from the rear showing disassembly features.

As may be seen by reference to the drawings, the cooking stand afforded by this invention has two substantially parallel longitudinal separated foot members 15, 16, provided for holding the stand stably in place on the ground straddling a campfire 17 while holding food in place for cooking. These support members respectively form substantially L-shaped end members on either side of the fire 17 by means of appended vertically extending cooking utensil mounting posts 18, 19 held apart by frame members 20, 21. The vertical posts have structure for mating with and holding in position at various vertical positions one or more implements and utensils having cooking surfaces such as the grill member 22. In this embodiment the support and mounting post members may be of various construction such as L-shaped iron members, but are preferably U-channel members, as shown. The array of vertically spaced notches 23 in the vertical mounting posts 18, 19 simply provide mounting means for engaging a rod 24 on the grill 22 or corresponding lips, etc. on the other cooking surfaces. Optionally, the L-shaped end members may be single unitary pieces, or assembled posts put together by easily manually installable brackets 25. As seen best from FIG. 3, the rear frame members 20, 21 can be pivoted at one end 26 and held in place by gravity at the other end with notch 28 mating over post 27, thus providing ready disassembly. The pivoting feature is identified at the pivot ends by the arrows 28.

Figure 1:
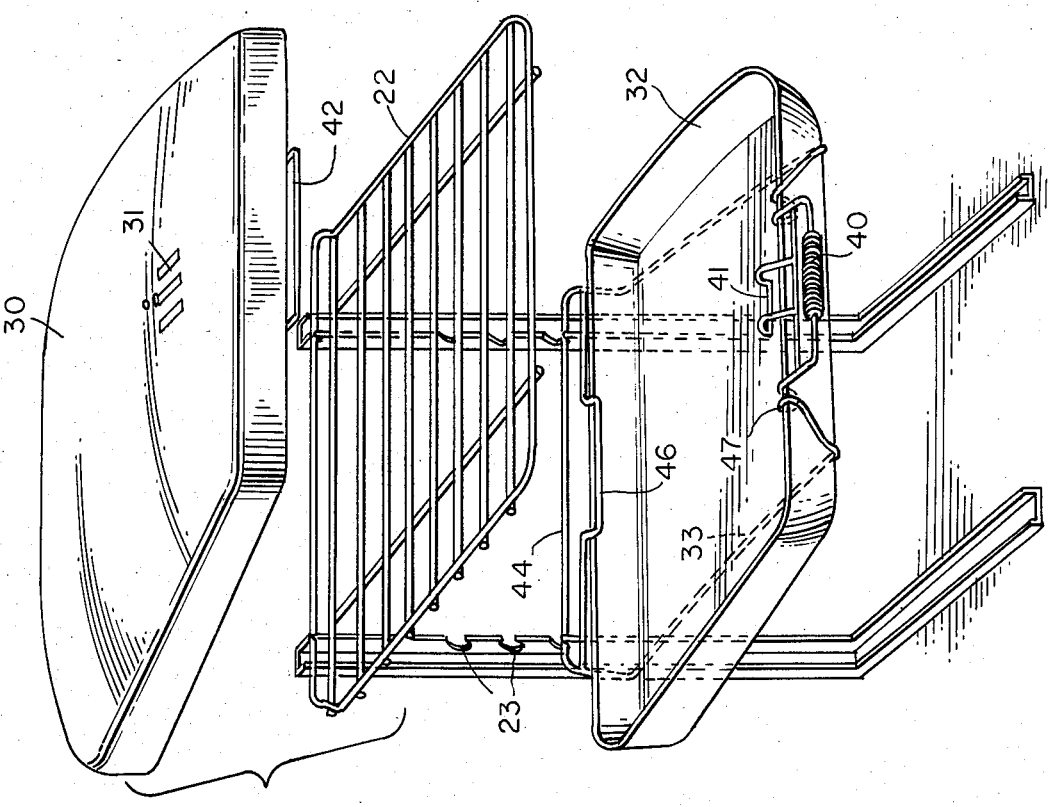
FIG. 1 is a perspective partially exploded sketch of a cooking stand structure embodying the invention.

As seen from FIG. 1, two further cooking utensils may be mounted and held at various vertical positions in notches 23, namely the cover 30, vented by a manually controlled vent valve 31, and a pan shaped cooking vessel 32 about which a wire frame 33 is held in place by elastic friction.

Figure 2:
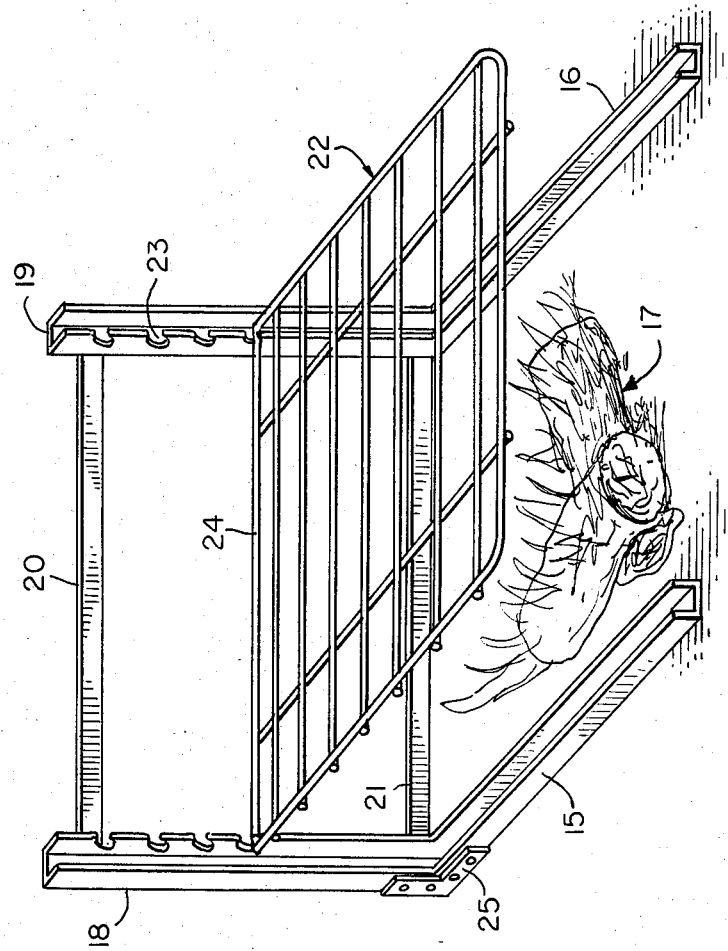
FIG. 2 is a perspective sketch of the cooking stand structure afforded by this invention as assembled for grilling over an open campfire.

The vertical mounting notches 23, or other equivalent positioning means, is arranged to mount the various cooking utensils 22, 30, 32 in a variety of positions, either spaced or adjacent. Thus, cover 31 and utensil pan 32 can be mounted in the same notch 23 for a covered kettle function such as used in steaming food. The grill cooking surface 22 can also be mounted therebetween for a conventional covered charcoal grill combination, with charcoal in the lower utensil pan 32. Spacing between the grill and charcoal containing cooking implement 32 can occur as shown in FIG. 1, where the optionally used cover implement 30 is shown in exploded non-mounted view for clarification. The lower utensil pan 32, when it contains food, is mounted over a campfire as shown in FIG. 2, and thus may serve the various functions as a frying pan, steamer, boiling or simmering pan, covered or open, or covered baking oven, etc. when the separable carrying case members are accordingly spaced or adjacent along the vertically extending rack structure.

Figure 4:
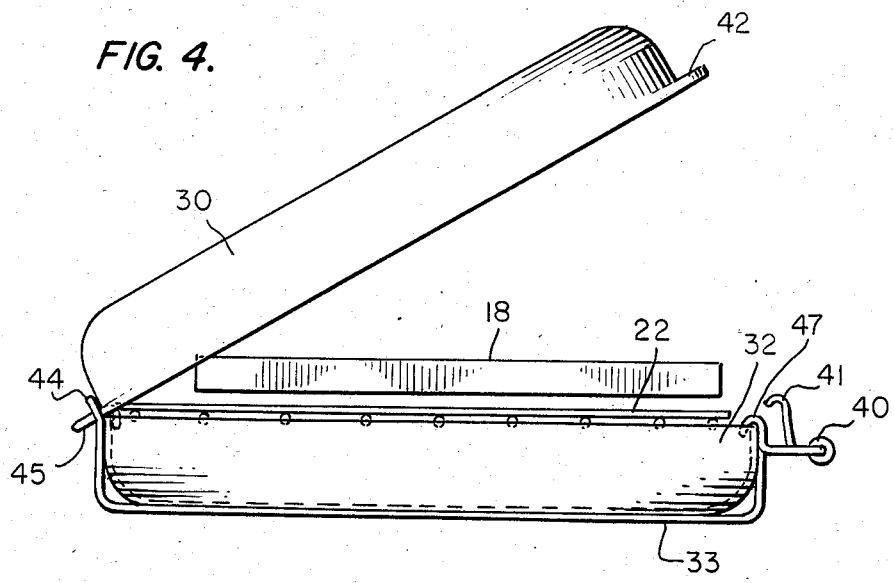
FIG. 4 is an end view sketch illustrating the cooking stand in disassembled form, packed for transport.

The wire frame 33 about utensil pan 32 is resiliently elastically fit in place to serve as a hinge, closing latch, carrying handle, and mounting framework mating with notches 23. Thus, as seen from FIG. 4, the cover 30 and utensil pan 32 mate to produce a storage and carrying case which holds all the other cooking stand parts such as mounting post 18 and grill 22 thereinside for compact storage and for easy manual transport by way of handle 40.

The spring latch 41 of wire frame 33 mates with the lip 42 on the cover to provide latching means. The cooking stand mounting rod 44 also serves as a hinging member into which the rear lip 45 on cover member 30 mates. The clip portions 46, 47 of the wire frame member 33 serves to lodge the frame in place about the outer surface of utensil pan 32 in mating indentations in the pan 32 edge if desired.

It is evident therefore that this invention has advanced the state of the art in providing a truly portable and compactly stored outdoor cooking stand which can use various fuel sources and which can cook food in various cooking modes, yet which is simple, inexpensive and stylish. Accordingly, those novel features which are believed to indicate the nature and spirit of this invention are defined with particularity in the following claims.

I claim:

1. An outdoor cooking stand assembly comprising in combination, a base structure for resting on the ground,
   a vertically extending structure having mounting means therein for adjustably holding in place at various vertical locations a mating cooking utensil providing a cooking surface for holding food in place while cooking,
   the vertically extending structure being adapted to interconnect with the base structure to support in stable condition food located on said cooking surface, and
   a carrying case comprising a utensil pan shaped receptacle member for receiving therein all the parts of the cooking stand for storage and transport thereof in the carrying case with mating structure on the pan shaped receptacle member for mating with said mounting means in place on the vertically extending structure as a cooking implement wherein the carrying case comprises a vented hood member adapted to mate with said vertically extending structure above the cooking surface.

2. A cooking stand as defined in claim 1 wherein the base structure has a pair of separated foot members spaced to straddle a campfire to be used as a fuel source.

3. A cooking stand as defined in claim 1 wherein the pan shaped member is mounted on said vertically extending structure as a charcoal briquette fuel source container for supplying cooking heat to said cooking surface.

4. An outdoor cooking stand assembly comprising in combination, a base structure for resting on the ground,
   a vertically extending structure having mounting means therein for adjustably holding in place at various vertical locations a mating cooking utensil providing a cooking surface for holding food in place while cooking,
   the vertically extending structure being adapted to interconnect with the base structure to support in stable condition food located on said cooking surface, and
   a carrying case comprising a utensil pan shaped receptacle member for receiving therein all the parts of the cooking stand for storage and transport thereof in the carrying case with mating structure on the pan shaped receptacle member for mating with said mounting means in place on the vertically extending structure as a cooking implement wherein the carrying case comprises two hinged mating members separable to provide two different cooking implements each having mating structure for positioning at various vertical positions on said mounting means on the vertically extending structure.

5. A cooking stand as defined in claim 4, including a wire frame resiliently and elastically fitting in place over one of the two hinged members shaped to provide a hinge about which the other hinged member pivots, a carrying handle for carrying the cooking stand assembly when stored in the case, a closing latch for mating the two hinged members together as a storage and carrying case, and a mounting member for mating with the mounting means on the vertically extending structure for positioning the accompanying hinged member vertically in various positions as a cooking implement.

* * * * *